June 2, 1936.  C. E. STEWART  2,043,077
AXLE DRIVE MECHANISM
Filed May 20, 1935
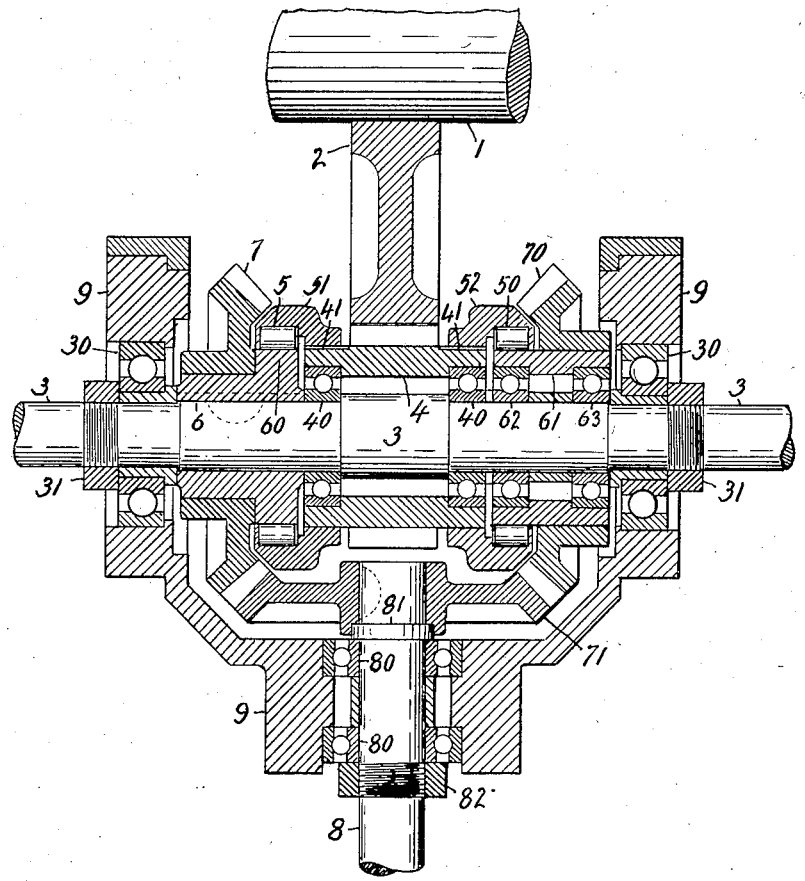
INVENTOR
Charles E. Stewart
BY
Hanbury A. Budden
ATTORNEY Patented June 2, 1936

2,043,077

UNITED STATES PATENT OFFICE 2,043,077

AXLE DRIVE MECHANISM

Charles E. Stewart, Verdun, Quebec, Canada, assignor to Juno Corporation Limited, Montreal, Quebec, Canada, an incorporated company Application May 20, 1935, Serial No. 22,413

3 Claims. (Cl. 74—367)

This invention relates to improvements in axle drive mechanism particularly when employed to operate auxiliary equipment such as speedometers, generators and the like.

The object of the invention is to provide a direct unidirectional drive from the rotary axle to the shafts geared to operate the auxiliary equipment.

A further object is to provide a simple, inexpensive and compact mechanism which will automatically convert a reversible drive into a continuous drive.

Further objects will be set forth hereinafter.

Reference is made to the accompanying drawing in which:—

Figure 1 shows a horizontal sectional view through the axis of the driven shaft.

The axle 1 which operates the drive has a main drive gear 2 secured to it. This gear 2 meshes with a loose pinion 4 journalled on ball bearings 40 on the driven shaft 3, parallel to the axle 1. The shaft 3 is journalled in ball bearings 30 at each side of the casing 9, held by lock nuts 31. The pinion 4 has side extensions 41 to which are keyed the clutch rings 51 and 52 or two over-running clutches 5 and 50 adapted to operate in reverse directions of rotation.

A sleeve 6 keyed to the shaft 3 has a flange 60 providing the inner member of the clutch 5.

A bevel gear 7 is secured to the sleeve 6.

At the other side of the pinion 4 a sleeve 61 is journalled on ball bearings 62 and 63 on the shaft 3. One end of this sleeve 61 forms the inner member of the clutch 50.

A bevel gear 70 is secured to the sleeve 61.

Journalled in ball bearings 80 in the frame 9 at right angles to the shaft 3 is the shaft 8.

This shaft 8 has a collar 81 and has secured to its end the bevel gear 71 which meshes with the bevel gears 7 and 70. Locknuts 31 and 82 are provided to hold the ball bearings in place.

With this construction the operation takes place as follows:—

The rotation of the axle 1 is transmitted to the pinion 4 through the drive gear 2.

If the rotation of the pinion 4 closes the clutch 5 the drive will be from the pinion 4 through the clutch 5 and sleeve 6 to the shaft 3.

If the rotation of the axle 1 should be reversed that of the pinion 4 will also be reversed. This change of rotation will open clutch 5 and close clutch 50 and the drive will be through clutch 50 and bevel gears 70, 71 and 7 to shaft 3 in the same direction of rotation as before.

The direction of the shaft 8 will always remain the same as the bevel gear 71 will rotate in the same direction whether driven by bevel gear 7 or bevel gear 70.

Where the shaft 8 is not required it can be replaced by a pivot pin for the bevel gear 71.

The opening and closing of the clutches 5 and 50 are automatic and operate instantly.

The auxiliary mechanism to be operated may be connected to the shaft 3 at either end and the shaft 8 either by direct couplings or through flexible shafts.

The device is particularly useful with flexible shafts where a drive in unidirectional rotation avoids the damage caused to such shafts by changes in the direction of rotation.

What I claim is:—

1. In an axle drive mechanism, the combination of a drive axle, a drive gear thereon, a driven shaft journalled parallel to the axle, a loose pinion meshing with the drive gear journalled on the shaft, having side extensions, over-running clutch rings keyed to each extension adapted to operate in reverse rotation, with sleeves, one of which is keyed to the shaft and carries a bevel gear, the other of which is journalled on the shaft and carries an opposite bevel gear, and a third bevel gear meshing with the other two bevel gears pivoted at right angles to the shaft.

2. In an axle drive mechanism, the combination of a drive axle, a drive gear thereon, a driven shaft journalled parallel to the axle in the sides of a casing, a loose pinion meshing with the drive gear journalled on the shaft, reverse over-running clutches at each side of the pinion, a train of bevel gears, one end bevel gear keyed to the shaft, the other end bevel gear journalled about the shaft, each end bevel gear coupled to the pinion by one of the reverse clutches, the intermediate bevel gear mounted on the end of a second shaft journalled in the casing at right angles to the first shaft.

3. In an axle drive mechanism, the combination of a drive axle, a gear thereon, a driven shaft journalled parallel to the axle, a loose pinion on the shaft meshing with the gear, reverse over-running clutches at the sides of the pinion, a train of bevel gears, the end gears mounted about the shaft, each coupled to the pinion by one of the clutches and one bevel gear keyed to the shaft.

CHARLES E. STEWART.